United States Patent [19]
Berg et al.

[11] 4,062,416
[45] Dec. 13, 1977

[54] ELECTROMAGNETICALLY COMPENSATING BEAMLESS DYNAMOMETER OR WEIGHING MACHINE

[75] Inventors: Christoph Berg; Eberhard Stadler, both of Gottingen, Germany

[73] Assignee: Sartorius-Werke GmbH, Germany

[21] Appl. No.: 677,212

[22] Filed: Apr. 15, 1976

[30] Foreign Application Priority Data

Apr. 23, 1975 Germany .............................. 2518022

[51] Int. Cl.² ......................... G01G 7/02; G01G 21/24
[52] U.S. Cl. ............................... 177/210 EM; 177/229
[58] Field of Search ............ 177/210 EM, 210 C, 212, 177/229; 73/141 R

[56] References Cited

U.S. PATENT DOCUMENTS

| | | | |
|---|---|---|---|
| 3,080,936 | 3/1963 | Sher | 177/210 EM |
| 3,786,883 | 1/1974 | Kunz | 177/210 EM X |
| 3,799,281 | 3/1974 | Wernitz | 177/210 EM |

*Primary Examiner*—Joseph W. Hartary
*Attorney, Agent, or Firm*—Browdy & Neimark

[57] ABSTRACT

A beamless dynamometer or weighing machine has a work coil positioned in a working air gap of a magnet arrangement. A pair of elastic links of trapezoid-shaped construction are attached to a bracing part. The median axis of the work coil is arranged within a trapezoid bounded by arms and sides of the links. The magnet arrangement is positioned in space bounded by the links.

22 Claims, 6 Drawing Figures

ELECTROMAGNETICALLY COMPENSATING BEAMLESS DYNAMOMETER OR WEIGHING MACHINE

BACKGROUND OF THE INVENTION

The invention relates to an electromagnetically compensating beamless dynamometer or weighing machine having a work coil movable in the working air gap of a magnet arrangement held stationary and a parallel construction with two elastic links which are arranged in planes staggered in the direction of movement and are attached to a bracing part maintained stationary and to a rigid connecting element movable with the work coil so as to form a parallelogram, and each of which exhibits two arms of equal length staggered in a plane.

Machines of this type are known. In them the arms of the links are customarily aligned mutually parallel (e.g. CH-PS 521 575).

An apparatus is also known (US-PS 3 191 702) in which the links are of E-shaped construction and the two outer tongues are attached to the part maintained stationary, whereas the rigid connecting element is attached to the end of the central tongue of each link which is likewise directed towards the part maintained stationary.

These known constructions suffer from the disadvantage then when lateral forces or a corner load are absorbed a complicated distribution of forces occurs in their links which renders the interpretation very difficult and necessitates a robust construction of the links. In both cases the links exhibit a wide base on their side remote from the part maintained stationary, which dictates a relatively large overall bulk.

A top-pan balance is also known (DT-Gbm 71 15 570) wherein the links are attached to the movable part of the guide means at any one point and exhibit substantially the form of a triangle, whilst the bearing positions lie at least approximately in the corner points of this triangle. It is intended by the triangular configuration of the links to avoid any static over-determination in order to simplify the calculation and interpretation.

If this version is to be constructed as electromagnetically compensating, then the part receiving the force to be measured or the load to be weighed, i.e. the pan in the case of a top-pan balance, must lie with its median axis on the line connecting the two apices of the triangles, because in the case of a displacement of the median axis out of the connecting line, lateral forces cause torques which cannot be absorbed satisfactorily by the triangular links due to the fact that each link is fastened to the moving part in only one point.

Lastly, an electromagnetically compensating beamless dynamometer or weighing machine is known (DT-Gbm 72 05 983) in which the links are of annular construction. Although this known construction permits a compact assembly, nevertheless the so-called "Knackfrosch" effect occurs easily in the links of annular construction, so that this guide system is unsuitable for precision balances and even finer balances.

SUMMARY OF THE INVENTION

The aim of the invention is to develop an electromagnetically compensating beamless dynamometer or weighing machine of the type initially defined in such a way that it ensures a more compact construction with higher resolution and higher precision in a simple manner.

In order to achieve this aim it is provided according to the invention that the links are of trapezoid-shaped-construction and are attached to the bracing part by the mutually more remote ends of their arms, that the median axis of the work coil lies within the trapezoid bounded by the arms and parallel connecting sides of the links at right angles to the trapezoid surfaces and that the principal part of the magnet arrangement is arranged in the space bounded by the links.

At the same time the connecting element is preferably attached rigidly to a rigidly constructed connecting arm which extends into the region between the arms of the links and is connected firmly to the work coil, whilst advantageously the longitudinal axis of the connecting arm is arranged in the plane of symmetry between the arms of the links and the median axis or the principal axis of movement of the part receiving the force to be measured or load to be weighed, i.e. in the case of a balance or scale, is arranged within the trapezoid bounded by the arms and parallel connecting sides at right angles to the trapezoid surfaces and that a support arm of rigid construction connected rigidly to the connecting element is connected firmly to the receiving part in the direction of its principal axis of movement.

In an advantageous further development the principal axis of movement of the receiving part and/or the median axis of the work coil are arranged in the plane of symmetry between the arms of the links and preferably in or near the plane of symmetry between the parallel sides of the link trapezium and advantageously coincide.

A considerable advantage of the invention lies in the fact that an extremely compact construction can be achieved, whilst simultaneously, on the one hand a wide bracing of the links of the part maintained stationary is possible and on the other hand due to the trapezoid shape instead of triangular construction the links can absorb torques acting in the region of their short parallel side, so that the principal axis of movement of the part receiving the force to be measured or load to be weighed, and also the magnet arrangement with work coil, can be displaced into the interior of the trapezoid.

A further substantial advantage of the invention is that the static over-determination is much smaller than for links parallel arms due to the different length of the two parallel sides.

In a preferred embodiment, the connecting arm and the support arm are arranged on the connecting element at a mutual interval, so that any elastic tilting movements of the support arm due to a corner loading of the receiving part are kept away from the work coil. For this purpose the support arm is preferably arranged in the region of the upper link and the connecting arm in the region of the lower link.

A considerable advantage of this embodiment lies in the fact that the work coil always remains in the optimum position in the ring air gap, independently of corner loadings, and consequently high precision of measurement is possible.

In another advantageous further development, where greater stress is laid on compact construction, the support arm and the connecting arm are arranged in the region of the upper link and are mutually indentical.

The links are advantageously dimensioned so that the short parallel side of the link trapezoid is made at least sufficiently long for torques exerted upon the links through the receiving part (e.g. in the case of corner loading) to be adsorbed by the links with negligibly small errors, whilst preferably the length of the short parallel side and that of the long parallel side of the link trapezoid - measured between the median longitudinal lines of the obliquely extending arms at their ends in each case - exhibit a mutual ratio between one to three and two to three.

According to an advantageous embodiment, the arms of the links are connected firmly together by a short transverse bar bridging the short parallel side of the trapezoid. The arms of the links may likewise also be connected firmly together by a long transverse bar bridging the long parallel side.

The connecting element is advantageously connected firmly to the transverse bars approximately in their median region.

The arms are preferably of rigid construction and exhibit joints in the region of both their ends; according to one embodiment, the arms may also be of springy elastic construction throughout.

The magnet arrangement preferably comprises a pot-shaped magnet with a ring-shaped air gap which is constructed symmetrically of rotation about its principal longitudinal axis. In this case it is possible in simple manner to integrate the magnet arrangement with the bracing part which is maintained stationary, and optionally to construct the magnet arrangement itself as the principal element of the part of the top-pan balance which is maintained stationary.

If an embodiment of particularly compact height is desired, then advantageously the magnet arrangement and the work coil are arranged with their circumferences completely within the space bounded laterally by the arms and parallel sides of the links, because then the links can be staggered below the plane of the top end surface and above the plane of the lower end surface of the magnet arrangement.

On the other hand, if an arrangement of particularly compact circumference is desired, then advantageously the magnet arrangement and the work coil are arranged with their height totally within the space between the two links, because then the dimensions of the links can be chosen so that overall dimensions particularly compact in circumference are obtained.

Lastly, the bracing part can advantageously be constructed as a part of the magnet arrangement.

BRIEF DESCRIPTION OF THE DRAWINGS

The invention is described in exemplary manner hereinbelow with reference to the accompanying drawing, which shows schematically in.

DETAILED DESCRIPTION OF THE PREFERRED EMBODIMENTS

Figure 1:
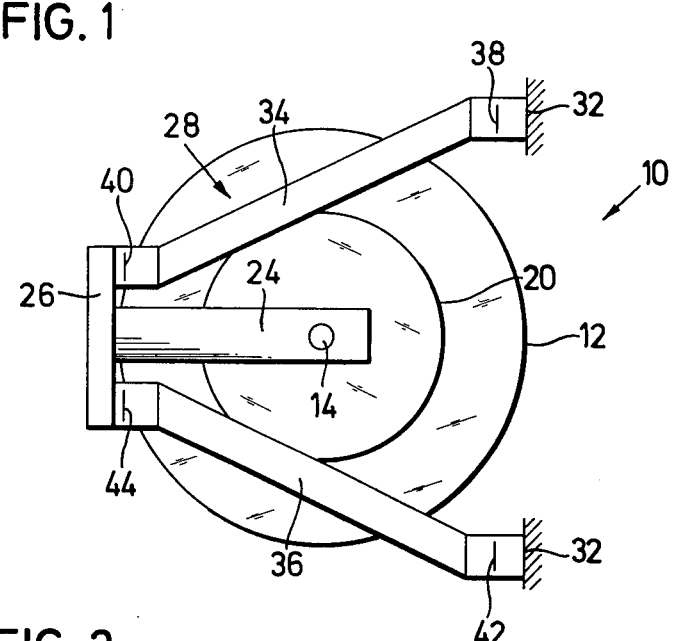
FIG. 1 is a plan of an embodiment according to the invention of a top-pan balance, in which a link of the parallel construction and the magnet arrangement projecting laterally peripherally beyond the arms of the link are illustrated, and the support pan has been omitted for reasons of clarity.
Figure 2:
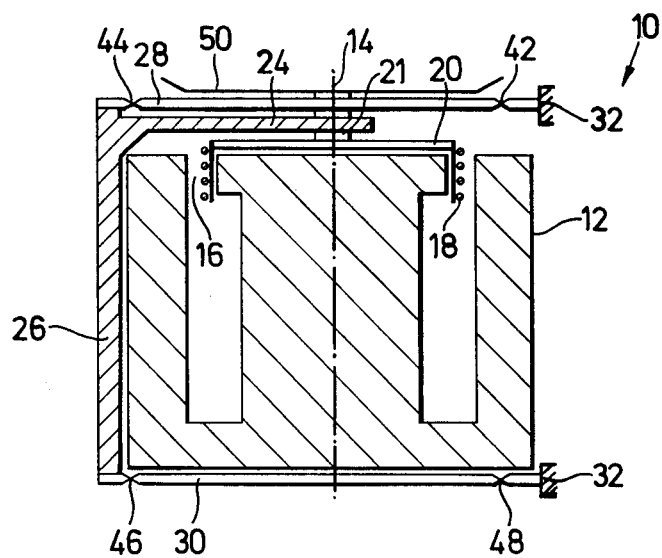
FIG. 2 is a side elevation of the embodiment illustrated in FIG. 1, in which the magnet arrangement is arranged, as to height, totally between the two links of the parallel construction.

According to FIGS. 1 and 2, a top-pan balance 10 constructed according to the invention comprises a magnet arrangement which is constructed in the form of a pot-shaped magnet 12. According to FIG. 1 the pot-shaped magnet 12 is symmetrical of rotation about its principal longitudinal axis 14.

The pot-shaped magnet 12 exhibits in the region of its top end face a ring-shaped air gap 16 in which a work coil 18 is arranged movably. The work coil 18 is connected firmly by means of a support sleeve 20 and of a support axle 22 to a connecting arm 24.

The connecting arm 24 itself is rigidly constructed and is firmly connected to a connecting element 26 of a parallel construction. The connecting arm 24 and the connecting element 26 are constructed integrally in the form of a gallows in side elevation in the embodiment illustrated.

The parallel construction comprises in addition to the connecting element 26, an upper link 28 and a lower link 30, which are both fastened by their other end to a bracing part maintained stationary which is illustrated purely schematically in the form of fixed clamping positions. The rigid connecting element 26 is inserted between the movable ends of the links 28 and 30.

The upper link 28 and the lower link 30 are of identical construction and will be described with reference to the upper link 28 shown in plan in FIG. 1. The link 28 comprises two arms 34 and 36, which in the embodiment illustrated are rigidly constructed and exhibit articulations 38, 40 or 42 and 44 in the region of both their ends. The articulations of the lower link 30 illustrated in FIG. 2 are designated 46 and 48.

The arms 34 and 36 of the link 28 are made of equal length and are staggered mutually in a common plane and aligned mutually at an angle. They form an equilateral trapezoid jointly with a side connecting their mutually closer ends and a longer side parallel to the latter connecting their mutually farther ends. The more widely spaced articulations 38 and 42 of the arms 34 and 36 are connected to the bracing part 32. The median axis of the work coil 18, which coincides with the principal longitudinal axis of the magnet arrangement 14, is arranged within the trapezoid bounded by the arms and the short and long parallel sides of the two links 28 and 30 at right angles to the trapezoid surfaces, namely in such a way according to FIGS. 1 and 2 that it is arranged in the plane of symmetry between the arms of the links 28 and 30 and close to the plane of symmetry between the parallel sides of the link trapezoid. This median axis likewise coincides with the median line of the support axle 22, which is firmly connected at one end to the support sleeve 20 and at the other end to a support pan 50 arranged above it.

The connecting arm 24 is thus arranged with its longitudinal axis in the plane of symmetry between the arms of the links. Furthermore, in the embodiment illustrated in FIGS. 1 and 2 the connecting arm 24 is identical with the support arm for the support pan 50 arranged as top-pan, the median axis of which coincides with the principal longitudinal axis 14 of the magnet arrangement or median axis of the work coil according to the illustration.

Again according to FIG. 1, the connecting element 26 simultaneously constitutes a transverse bar between the mutually closer articulations of the arms of the links, as is shown in conjunction with the articulations 40 and 44. The mutually closer articulations of the arms of the links can also be connected together by a particular transverse bar which is attached to the connecting element. This transverse bar may then be of elastic or rigid construction and the connecting element may be firmly connected to the transverse bars approximately in their central region. It is possible to manufacture the arms 34 and 36 and also the articulations 38, 40, 42 and 44 and the transverse bar connecting the mutually closer articulations 40 and 44 from a single piece and to grind-in the articulations later. Lastly it is also possible to connect the mutually farther articulations 38 and 42 firmly together by a transverse bar bridging the long parallel side and then to attach this transverse bar to the bracing part 32.

The length of the short parallel side and the length of the long parallel side of the link trapezoid measured in each case between the median longitudinal lines of the obliquely oriented arms at their transition to the articulations exhibit a mutual ratio of approximately one to three in the case of the embodiment illustrated in FIGS. 1 and 2.

The interval between the mutually farther articulations is chosen so that a tilt-free bracing of the entire movable arrangement is ensured. Because the arms of the links converge at an angle and their ends connected to the movable part are located relatively close together, the embodiment exhibits a compact assembly. Moreover, by this means the static over-determination, which is considerable in the case of parallel oriented arms, is reduced. The static over-determination could be completely eliminated if the arms were arranged in the form of a triangle. But in this case when lateral forces attack the support pan 50, the torque cannot be absorbed in the links because the lever arm in the region of the short parallel side would practically tend towards zero in the case of a triangular construction. Consequently in the extreme case the joints between links and movable connecting part can be destroyed, or under a smaller stress corner load errors may be caused which are no longer negligible in relation to the desired precision of measurement.

Because in the embodiment according to the invention, even the mutually closer ends of the arms still exhibit a finite interval which is of the order of magnitude of from one-third to two-thirds of the interval between the mutually farther of the arms, the torques which appear can be absorbed by the links so that the links continue to work their movement characteristics in the linear range and the correct functioning is maintained.

Figure 3:
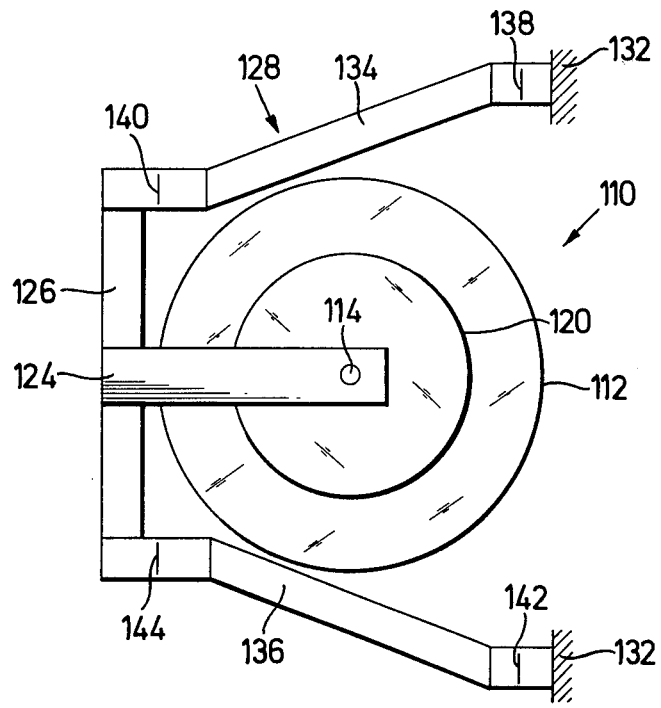
FIG. 3 is a plan similar to FIG. 1 of a further embodiment in which the magnet arrangement is arranged, as regards its circumference, totally between the arms of the links.
Figure 4:
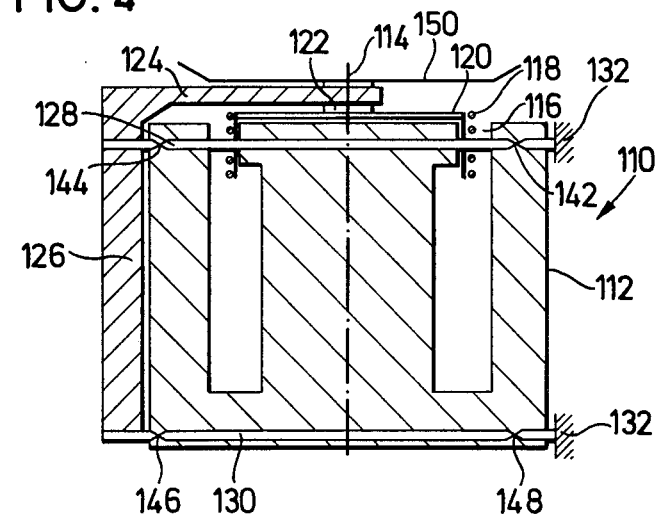
FIG. 4 is a side elevation to FIG. 3, according to which the magnet arrangement projects in height slightly beyond the two links.

In the embodiment illustrated in FIGS. 3 and 4, identical parts are provided with the same reference numerals, which are prefixed by a digit 1. This embodiment differs from the embodiment illustrated in FIGS. 1 and 2 fundamentally only in as much as the pot-shaped magnet 112 is arranged, as regards its circumference, totally within the trapezoid bounded by the arms of the links 128 and 130 and the short and long parallel sides. For this purpose it is necessary to construct the short parallel side longer in proportion to the long parallel side in order that the mutually farther articulations are not placed at too great a mutual interval to maintain the compact construction. The embodiment illustrated in FIGS. 3 and 4 also differs in as much as the magnet arrangement 112, as regards its height, is no longer arranged totally between the two links 128 and 130, but projects slightly downwards and upwards. By this means a compact construction of particularly low height is achieved, whereas in the case of the embodiment illustrated in FIGS. 1 and 2 a compact assembly with particularly small circumference is obtained.

Figure 5:
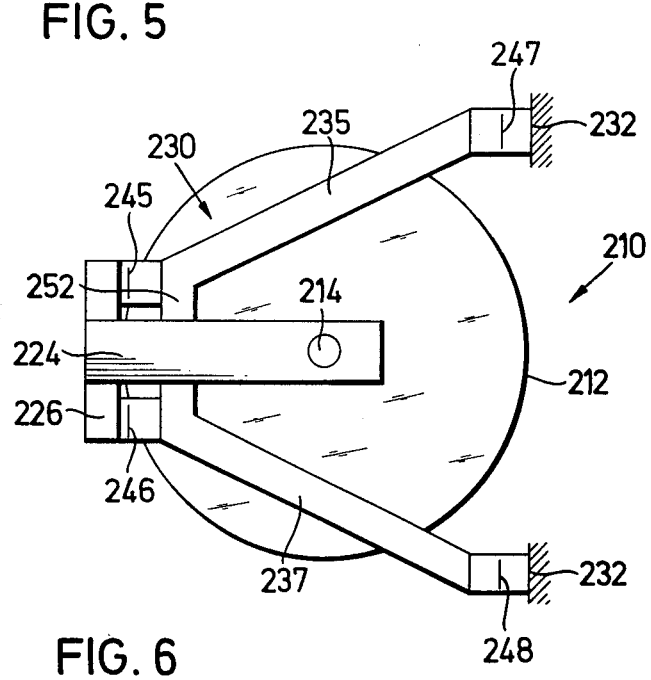
FIG. 5 is a bottom plan of another embodiment, in which the links are differently conformed and the magnet gap is not shown.
Figure 6:
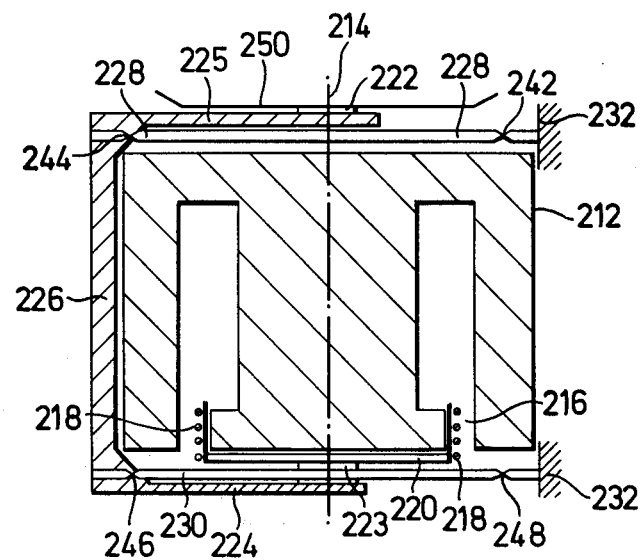
FIG. 6 is a side elevation to FIG. 5, according to which the magnet arrangement is arranged, as to height, totally between the two links of the parallel construction and is aligned with its air gap downwards and the connecting arm with the work coil are arranged in the region of the lower link.

The third embodiment illustrated in FIGS. 5 and 6 differs not only by a different construction of the links, but also additionally by a displacement of the ring-shaped air gap 216 into the region of the lower end face of the pot-shaped magnet 212. Because the connecting arm 224 associated with the work coil 218 which is likewise displaced downwards, is likewise arranged in the region of the lower end face of the pot-shaped magnet 212 end of the lower link 230, this embodiment necessitates for the support pan 250 a support arm 225 constructed separately from the connecting arm 224. Both the connecting arm 224 and the support arm 225 are rigidly constructed and are integral with the rigid connecting element 226. The connecting arm 224, the support arm 25 and the connecting element 226 form a sideways tilted U-shape in cross-section.

Due to the displacement of the work coil into the region of the lower link 230 and the mutual separation of connecting arm 224 and support arm 225 so that the connecting arm 224 is arranged in the region of the lower link 230 and the support arm 225 in the region of the upper link 228, the work coil is kept practically free from tilting movements of the support axle 222 during corner loadings of the support pan 250. The coil thus maintains its optimum position in the ring-shaped air gap 216 even in the case of intense corner loadings of the support pan 250.

Because the connecting arm 224 is a part essential to the invention in the case of the embodiment illustrated in FIGS. 5 and 6, FIG. 5 is a bottom plan of the top-pan balance illustrated in FIG. 6.

Of the two links, the lower link 230, which is identical with the upper link 228, is illustrated. The link 230 differs from the links of the previously described embodiments in that the arms 235 and 237 are constructed integrally with a transverse bar 252 in the region of their mutually closer ends, and the mutually closer articulations 245 and 246 are located outside the trapezoid formed by the arms 235 and 237, the transverse bar 252 and the longer parallel side. The mutually closer articulations 245 and 246 connect the transverse bar 252 of the arms 235 and 237 to the rigid connecting element 226 which connects the links 228 and 230 together at the movable end.

The arms 235 and 237 of the link 230 illustrated in FIG. 5, including the integrated transverse bar 252, may be of rigid or springy elastic construction.

Similarly as for the embodiment illustrated in FIGS. 1 and 2, in the case of the embodiment illustrated in FIGS. 5 and 6 the pot-shaped magnet 212 is also, as regards its height, arranged totally within the two links 228 and 230, and as to its circumference, projects somewhat beyond the arms of the links, so that a construction particularly compact with regards to its circumference is obtained. With this construction it is again possible to keep the length of the shorter parallel side of the order of magnitude of one-third of the length of the parallel side, without moving the mutually farther articulations of each link too far apart.

We claim:

1. In an electromagnetically compensating beamless dynamometer or weighing machine having a work coil movable along its median axis in a working air gap of a stationary magnet arrangement with a principal portion, a parallel construction with two elastic links which are arranged in planes staggered in a direction of movement and are connected to a bracing part maintained stationary and to a rigid connecting element movable with the work coil so as to form a parallelogram the improvement wherein each of said links is defined by two arms of equal length staggered in a respective plane, each of said links being of trapezoid-shaped construction defined by its respective two arms and being attached by mutually farther ends of their respective arms to said bracing part, said median axis of said work coil being arranged within a trapezoid bounded by said arms and parallel connecting sides of said links at right angles to surfaces of said trapezoid and said principal portion of said magnet arrangement being arranged in space bounded by said links.

2. An improved apparatus according to claim 1, wherein said connecting element is connected rigidly to a rigidly constructed connecting arm which extends in a region between said arms of said links, is firmly connected to said work coil and has a longitudinal axis, said longitudinal axis being arranged in a plane of symmetry between said arms of said links.

3. An improved apparatus according to claim 1, including a receiving part for receiving force to be measured or load to be weighed, said part having a principal axis of movement arranged within said trapezoid bounded by said arms and said parallel connecting sides at right angles to said trapezoid surfaces, and a support arm of rigid construction connected rigidly to said connecting element, said support arm being connected firmly to receiving part in the direction of its said principal axis of movement.

4. An improved apparatus according to claim 3, wherein said receiving part is a pan.

5. An improved apparatus according to claim 3, wherein said principal axis of movement of said receiving part is arranged in a plane of symmetry between said arms of said links.

6. An improved apparatus according to claim 3, wherein at least one axis of said principal axis of movement of said receiving part and said median axis of said work coil is arranged at least close to a plane of symmetry between said parallel sides of said links.

7. An improved apparatus according to claim 6, wherein said principal axis of movement of said receiving part and said median axis of said work coil coincide.

8. An improved apparatus according to claim 1, wherein said median axis of said work coil is arranged in a plane of symmetry between said arms of said links.

9. An improved apparatus according to claim 1, wherein said median axis of said work coil is arranged at least close to a plane of symmetry between said parallel sides of said links.

10. An improved apparatus according to claim 1, including a connecting arm and a support arm arranged on said connecting element with a mutual interval whereby tilting movements of said support arm during corner loading of a receiving part are kept away from said work coil.

11. An improved apparatus according to claim 10, wherein said support arm is arranged in the vicinity of the upper one of said links and wherein said connecting arm is arranged in the vicinity of the lower one of said links.

12. An improved apparatus according to claim 10, wherein said support arm and said connecting arm are arranged in the vicinity of the upper one of said links and are mutually identical.

13. An improved apparatus according to claim 1, wherein said arms are obliquely oriented, and wherein the length of the short parallel side and the length of the long parallel side of said trapezoid, measured between median longitudinal lines of said obliquely oriented arms at their ends, exhibit a mutual proportion between one to three and two to three.

14. An improved apparatus according to claim 1, wherein said arms of said links are connected firmly together by a short transverse bar bridging the short parallel side of said trapezoid.

15. An improved apparatus according to claim 1, wherein said arms of said links are connected firmly together by a long transverse bar bridging a long parallel side.

16. An improved apparatus according to claim 15, wherein said connecting element is firmly connected to said transverse bars approximately in their central region.

17. An improved apparatus according to claim 1, wherein said arms exhibit articulations in the region of both their ends.

18. An improved apparatus according to claim 1, wherein said arms are of springy elastic construction.

19. An improved apparatus according to claim 1, wherein said magnet arrangement comprises a pot-shaped magnet with a ring-shaped air gap which is symmetrical about its principal longitudinal axis.

20. An improved apparatus according to claim 1, wherein said magnet arrangement and said work coil, as regards their circumference, are arranged totally within space bounded laterally by said arms and parallel sides of said links.

21. An improved apparatus according to claim 1, wherein said magnet arrangement and said work coil, as regards their height, are arranged totally in space between said two links.

22. An improved apparatus according to claim 1, wherein said bracing part is constructed as a part of said magnet arrangement.

* * * * *